(12) United States Patent
Yoshida et al.

(10) Patent No.: US 10,126,322 B2
(45) Date of Patent: Nov. 13, 2018

(54) ACCELERATION SENSOR

(71) Applicant: PANASONIC INTELLECTUAL PROPERTY MANAGEMENT CO., LTD., Osaka (JP)

(72) Inventors: Hitoshi Yoshida, Osaka (JP); Nobuyuki Ibara, Osaka (JP); Hideki Ueda, Osaka (JP); Takeshi Okada, Osaka (JP); Takeshi Mori, Osaka (JP); Masatoshi Nomura, Osaka (JP); Katsumi Kakimoto, Osaka (JP); Yuji Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/617,777

(22) Filed: Jun. 8, 2017

(65) Prior Publication Data

US 2017/0276696 A1 Sep. 28, 2017

Related U.S. Application Data

(63) Continuation of application No. 14/874,845, filed on Oct. 5, 2015, now Pat. No. 9,702,895, which is a
(Continued)

(30) Foreign Application Priority Data

Nov. 24, 2009 (JP) .................................. 2009-266581
Nov. 24, 2009 (JP) .................................. 2009-266582
(Continued)

(51) Int. Cl.
*G01P 15/125* (2006.01)
*G01P 15/08* (2006.01)
*G01P 15/18* (2013.01)

(52) U.S. Cl.
CPC ........ *G01P 15/125* (2013.01); *G01P 15/0802* (2013.01); *G01P 15/18* (2013.01); *G01P 2015/0831* (2013.01)

(58) Field of Classification Search
CPC ........... G01P 15/125; G01P 2015/0831; G01P 2015/0834
See application file for complete search history.

(56) References Cited

U.S. PATENT DOCUMENTS 5,054,320 A 10/1991 Yvon
5,367,429 A 11/1994 Tsuchitani et al.
(Continued)

FOREIGN PATENT DOCUMENTS

CN 101198874 A 6/2008
CN 101432627 A 5/2009
(Continued)

OTHER PUBLICATIONS

Non-Final Office Action issued in U.S. Appl. No. 13/511,178, dated Sep. 5, 2014.
(Continued)

*Primary Examiner* — John Chapman, Jr.
(74) *Attorney, Agent, or Firm* — McDermott Will & Emery LLP

(57) ABSTRACT

An acceleration sensor includes a weight portion having a recess section and a solid section, beam portions, a movable electrode provided on the opposite surface of the weight portion from an open surface of the recess section to extend over the recess section and the solid section, a first fixed electrode arranged at the opposite side of the movable electrode from the recess section, and a second fixed electrode arranged at the opposite side of the movable electrode from the solid section. The acceleration sensor detects acceleration using a change in capacitance between the
(Continued)

movable electrode and the fixed electrodes caused by rotation of the weight portion. The beam portions are shifted toward the recess section such that an angle between a perpendicular line extending from a gravity center position of the weight portion to the rotation axis and a surface of the movable electrode becomes equal to 45 degrees.

38 Claims, 12 Drawing Sheets

Related U.S. Application Data continuation of application No. 14/718,493, filed on May 21, 2015, now Pat. No. 9,244,094, which is a continuation of application No. 13/511,178, filed as application No. PCT/IB2010/002975 on Nov. 23, 2010, now Pat. No. 9,261,530.

(30) Foreign Application Priority Data

Nov. 24, 2009 (JP) .................................. 2009-266583
Nov. 24, 2009 (JP) .................................. 2009-266585

(56) References Cited

U.S. PATENT DOCUMENTS

| | | | |
|---|---|---|---|
| 5,974,880 | A | 11/1999 | Yamaguchi et al. |
| 6,065,341 | A | 5/2000 | Ishio et al. |
| 6,230,566 | B1 | 5/2001 | Lee et al. |
| 7,367,232 | B2 | 5/2008 | Vaganov et al. |
| 9,261,530 | B2 | 2/2016 | Yosida et al. |
| 2004/0226374 | A1 | 11/2004 | Kuisma et al. |
| 2005/0000082 | A1 | 1/2005 | Selvakumar et al. |
| 2006/0021436 | A1 | 2/2006 | Kapser et al. |
| 2007/0000323 | A1 | 1/2007 | Kuisma |
| 2007/0234804 | A1 | 10/2007 | Tamura et al. |
| 2008/0066546 | A1 | 3/2008 | Katsumata |
| 2009/0266164 | A1 | 10/2009 | Furukubo et al. |
| 2011/0138914 | A1 | 6/2011 | Yoshida et al. |

FOREIGN PATENT DOCUMENTS

| | | |
|---|---|---|
| CN | 102124352 A | 7/2011 |
| JP | 64-059161 A | 3/1989 |
| JP | S64-059161 A | 3/1989 |
| JP | H05-172846 A | 7/1993 |
| JP | H08-43426 A | 2/1996 |
| JP | H11-230986 A | 8/1999 |
| JP | 2000-019198 A | 1/2000 |
| JP | 2002-539460 A | 11/2002 |
| JP | 2006-049929 A | 2/2006 |
| JP | 2006-133245 A | 5/2006 |
| JP | 2006-172662 A | 6/2006 |
| JP | 2006-519387 A | 8/2006 |
| JP | 2007-298405 A | 11/2007 |
| JP | 2008-076153 A | 4/2008 |
| JP | 2008-544243 A | 12/2008 |
| WO | 2004-079373 A1 | 9/2004 |
| WO | 2006/009194 A1 | 1/2006 |
| WO | 2006/134232 A1 | 12/2006 |
| WO | 2009/020716 A1 | 2/2009 |
| WO | 2010/061777 A1 | 6/2010 |

OTHER PUBLICATIONS

Final Office Action issued in U.S. Appl. No. 13/511,178, dated Apr. 15. 2015.
Non-Final Office Action issued in U.S. Appl. No. 13/511,178, dated Aug. 27, 2015.
Notice of Allowance issued in U.S. Appl. No. 13/511,178, dated Oct. 2, 2015.
Non-Final Office Action issued in U.S. Appl. No. 14/718,493, dated Jul. 28, 2015.
Notice of Allowance issued in U.S. Appl. No. 14/718,493, dated Nov. 3, 2015.
Non-Final Office Action issued in U.S. Appl. No. 14/874,845, dated Apr. 4, 2016.
Final Office Action issued in U.S. Appl. No. 14/874,845, dated Jun. 22, 2016.
Notice of Allowance issued in U.S. Appl. No. 14/874,845, dated Sep. 12, 2016.
Non-Final Office Action issued in U.S. Appl. No. 14/874,845, dated Oct. 17, 2016.
Notice of Allowance issued in U.S. Appl. No. 14/874,845, dated Mar. 30, 2017.
English Summary of the Office Action dated Mar. 26, 2012, issued in corresponding Chinese Application No. 201080052810.1.
Search Report dated May 23, 2013, issued in corresponding European Application No. 10832714.9.
International Search Report for PCT/IB2010/002975, dated Apr. 19, 2011.

ACCELERATION SENSOR

RELATED APPLICATIONS

This application is a Continuation application of U.S. patent application Ser. No. 14/874,845, filed Oct. 5, 2015, which is a Continuation application of U.S. patent application Ser. No. 14/718,493, filed May 21, 2015, now U.S. Pat. No. 9,244,094, that issued on Jan. 26, 2016, which is a Continuation application of U.S. patent application Ser. No. 13/511,178, filed on May 22, 2012, now U.S. Pat. No. 9,261,530, that issued on Feb. 16, 2016, which the U.S. National Phase under 35 U.S.C. § 371 of International Patent Application No. PCT/IB2010/002975, filed on Nov. 23, 2010, which in turn claims the benefit of Japanese Application Nos. 2009-266585, 2009-266583, 2009-266582, and 2009-266581, filed on Nov. 24, 2009, the disclosures of which Applications are incorporated by reference herein.

FIELD OF THE INVENTION

The present invention relates to a capacitance-type acceleration sensor.

BACKGROUND OF THE INVENTION

There is conventionally known an acceleration sensor that includes, as shown in FIG. 5A, a rectangular parallelepiped weight portion 100 having a movable electrode, a pair of beam portions 101 for rotatably supporting the weight portion 100 substantially at a center in the longitudinal direction of the weight portion 100 and a pair of fixed electrodes 102 and 103 arranged in a spaced-apart opposing relationship with respect to one side and the other side of the surface of the weight portion 100 demarcated by a straight border line interconnecting the beam portions 101 (see, e.g., Patent Document 1). This acceleration sensor detects the acceleration applied to the weight portion 100 by differentially detecting the change in capacitance between the movable electrode (the section of the weight portion 100 facing the fixed electrodes 102 and 103) and the fixed electrodes 102 and 103 caused by the rotation of the weight portion 100 about the border line as a rotation axis. In this acceleration sensor, a recess portion 104 is formed at one side (the right side in FIG. 5A) of the rear surface of the weight portion 100 with respect to the border line so that the weight of the weight portion 100 can become different at one side (the right side) and the other side (the left side) thereof with respect to the border line. Therefore, upon applying acceleration, the moment acting about the border line as a rotation axis is generated in the weight portion 100. In order to prevent the section of the weight portion 100 having the recess portion 104 from being deformed by the ambient stresses, a reinforcing wall 105 for bisecting the recess portion 104 is one-piece formed with the weight portion 100 to extend in the direction parallel to the border line.

[Patent Document 1] Japanese Patent Application Publication No. 2008-544243

The acceleration sensor stated above is capable of detecting acceleration in two directions orthogonal to the rotation axis. The detection sensitivity in the two directions is equalized by setting the angle $\theta$ between the perpendicular line extending from the gravity center position of the weight portion 100 to the rotation axis and the surface of the weight portion 100 to become equal to about 45 degrees. In this regard, a method of increasing the area of the movable electrode is adoptable as one means for enhancing the detection sensitivity of the acceleration sensor. If this method is employed, the thickness of the weight portion 100 needs to be increased in order to keep the angle $\theta$ at about 45 degrees. This method is not realistic because the increase in the thickness of the weight portion 100 prolongs the duration of an etching step for forming the weight portion 100.

In order to keep the angle $\theta$ at about 45 degrees without increasing the thickness of the weight portion 100, it is thinkable to employ a method in which the weight of the weight portion 100 is reduced by cutting away the section of the weight portion 100 existing just below the beam portion 101 as shown in FIG. 5B. Use of this method, however, poses a problem in that the weight-reducing thin section of the weight portion 100 is insufficient in strength.

SUMMARY OF THE INVENTION

In view of the above, the present invention provides an acceleration sensor capable of enhancing detection sensitivity without having to increase the thickness of a weight portion or to reduce the weight of the weight portion.

In accordance with a first aspect of the present invention, there is provided an acceleration sensor, including: a sensor unit including a weight portion having a recess section with one open surface and a solid section one-piece formed with the recess section, a pair of beam portions configured to rotatably support the weight portion in such a state that the recess section and the solid section are arranged along a rotation direction, a movable electrode provided on the opposite surface of the weight portion from the open surface of the recess section to extend over the recess section and the solid section, a first fixed electrode arranged at the opposite side of the movable electrode from the recess section and a second fixed electrode arranged at the opposite side of the movable electrode from the solid section, the acceleration sensor being configured to detect acceleration based on a change in capacitance between the movable electrode and the fixed electrodes caused by rotation of the weight portion about a rotation axis defined by a straight line interconnecting the beam portions, wherein the beam portions are shifted toward the recess section such that an angle between a perpendicular line extending from a gravity center position of the weight portion to the rotation axis and a surface of the movable electrode becomes substantially equal to 45 degrees.

With such configuration, the increase of the area of the movable electrode and the resultant enhancement of the detection sensitivity can be realized by merely shifting the beam portions toward the first recess section such that an angle between a perpendicular line extending from a gravity center position of the weight portion to the rotation axis and a surface of the movable electrode becomes substantially equal to 45 degrees. It is therefore possible to enhance the detection sensitivity without having to increase the thickness of the weight portion or to reduce the weight of the weight portion.

In addition, a second recess section with one open surface may be provided in the first solid section of the weight portion. An auxiliary weight portion made of a metallic material may be embedded in the second recess section. By embedding the auxiliary weight portion in the second recess section, it is possible to reduce the size of the weight portion while maintaining the weight balance of the weight portion. Consequently, it is possible to reduce the overall size of the acceleration sensor.

In accordance with a second aspect of the present invention, there is provided an acceleration sensor, including: a sensor unit including a weight portion having a recess section with one open surface and a solid section one-piece formed with the recess section, a pair of beam portions configured to rotatably support the weight portion in such a state that the recess section and the solid section are arranged along a rotation direction, a movable electrode provided on the opposite surface of the weight portion from the open surface of the recess section to extend over the recess section and the solid section, a first fixed electrode arranged at the opposite side of the movable electrode from the recess section and a second fixed electrode arranged at the opposite side of the movable electrode from the solid section, the acceleration sensor being configured to detect acceleration based on a change in capacitance between the movable electrode and the fixed electrodes caused by rotation of the weight portion about a rotation axis defined by a straight line interconnecting the beam portions; and a first fixed plate arranged in a spaced-apart relationship with the surface of the weight portion facing the fixed electrodes, the fixed electrodes provided on one surface of the first fixed plate, wherein protrusions are formed on the surface of the movable electrode facing the fixed electrodes and wherein engraving sections are formed in the areas of the fixed electrodes facing the protrusions by digging out one surface of the first fixed plate.

In accordance with a third aspect of the present invention, there is provided an acceleration sensor, including: a sensor unit including a weight portion having a recess section with one open surface and a solid section one-piece formed with the recess section, a pair of beam portions configured to rotatably support the weight portion in such a state that the recess section and the solid section are arranged along a rotation direction, a movable electrode provided on the opposite surface of the weight portion from the open surface of the recess section to extend over the recess section and the solid section, a first fixed electrode arranged at the opposite side of the movable electrode from the first recess section and a second fixed electrode arranged at the opposite side of the movable electrode from the solid section, the acceleration sensor being configured to detect acceleration based on a change in capacitance between the movable electrode and the fixed electrodes caused by rotation of the weight portion about a rotation axis defined by a straight line interconnecting the beam portions, wherein protrusions are formed on the surfaces of the fixed electrodes facing the movable electrode.

With such configuration, even if an impact great enough to bring the protrusions into contact with the fixed electrodes is applied to the acceleration sensor, the protrusions come into contact with the first fixed plate through the engraving sections. Thus the protrusions do not make direct contact with the fixed electrodes. It is therefore possible to prevent the protrusions from adhering to the fixed electrodes.

In accordance with a fourth aspect of the present invention, there is provided an acceleration sensor, including: a sensor unit including a weight portion having a recess section with one open surface and a solid section one-piece formed with the recess section, a pair of beam portions configured to rotatably support the weight portion in such a state that the recess section and the solid section are arranged along a rotation direction, a movable electrode provided on the opposite surface of the weight portion from the open surface of the recess section to extend over the recess section and the solid section, a first fixed electrode arranged at the opposite side of the movable electrode from the recess section, a second fixed electrode arranged at the opposite side of the movable electrode from the solid section and a pair of electrode portions having detection electrodes electrically connected to the fixed electrodes, the acceleration sensor being configured to detect acceleration based on a change in capacitance between the movable electrode and the fixed electrodes caused by rotation of the weight portion about a rotation axis defined by a straight line interconnecting the beam portions, wherein the sensor unit includes two sensor units formed in a single chip, the electrode portions are arranged along one direction to divide the chip into two halves, the weight portions of the two sensor units are arranged in point symmetry with respect to a center of an array of the electrode portions, and the beam portions are arranged such that a straight line interconnecting the beam portions extends in a direction orthogonal to the arranging direction of the electrode portions.

With such configuration, the symmetry of the acceleration sensor as a whole is enhanced. Therefore, even when the acceleration sensor is distorted by thermal expansion or other causes, the distortion is uniformly generated in the entirety of the acceleration sensor. Thus the overall balance is not impaired. It is therefore possible to increase the accuracy of the output temperature characteristics. Moreover, the distances between the electrode portions and the weight portions become equal to each other and, therefore, the distances between the electrode portions and the fixed electrodes get equalized. This makes it possible to equalize the wiring lengths of the respective conductive patterns interconnecting the electrodes. Accordingly, it is possible to reduce the difference in parasitic capacitance of the respective conductive patterns and to reduce the difference in capacitance between the movable electrodes and the fixed electrodes. In addition, it is possible to increase the distance from the beam portions to the longitudinal ends of the weight portions, namely the rotation radii of the weight portions. This makes it possible to reduce the rotational displacement required for the sensor chip to obtain the same detection sensitivity as provided by the conventional acceleration sensor of the same size. Accordingly, it is possible to increase the bending strength of the beam portions. Even if the movable electrodes adhere to the fixed electrodes, it is possible to detach the movable electrodes from the fixed electrodes using the restoration force of the beam portions.

BRIEF DESCRIPTION OF THE DRAWINGS

Objects and features of the present invention will become apparent from the following description of preferred embodiments given in conjunction with the accompanying drawings.

DETAILED DESCRIPTION OF THE PREFERRED EMBODIMENTS

Embodiments of an acceleration sensor according to the present invention will now be described in detail with reference to the accompanying drawings. Throughout the drawings, identical or similar portions will be designated by like reference symbols with no description made thereon. In the following description, the vertical direction in FIG. 1 will be defined as an up-down direction, the direction parallel to the transverse direction of a sensor chip 1 as an x-direction, the direction parallel to the longitudinal direction of the sensor chip 1 as a y-direction and the direction orthogonal to the x-direction and the y-direction as a z-direction.

(First Embodiment)

Figure 1:
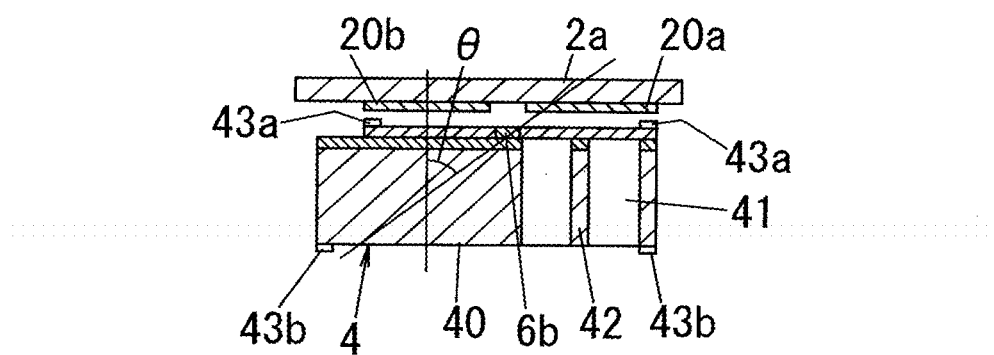
FIG. 1 is a partial section view showing an acceleration sensor according to a first embodiment of the present invention.
Figure 2:
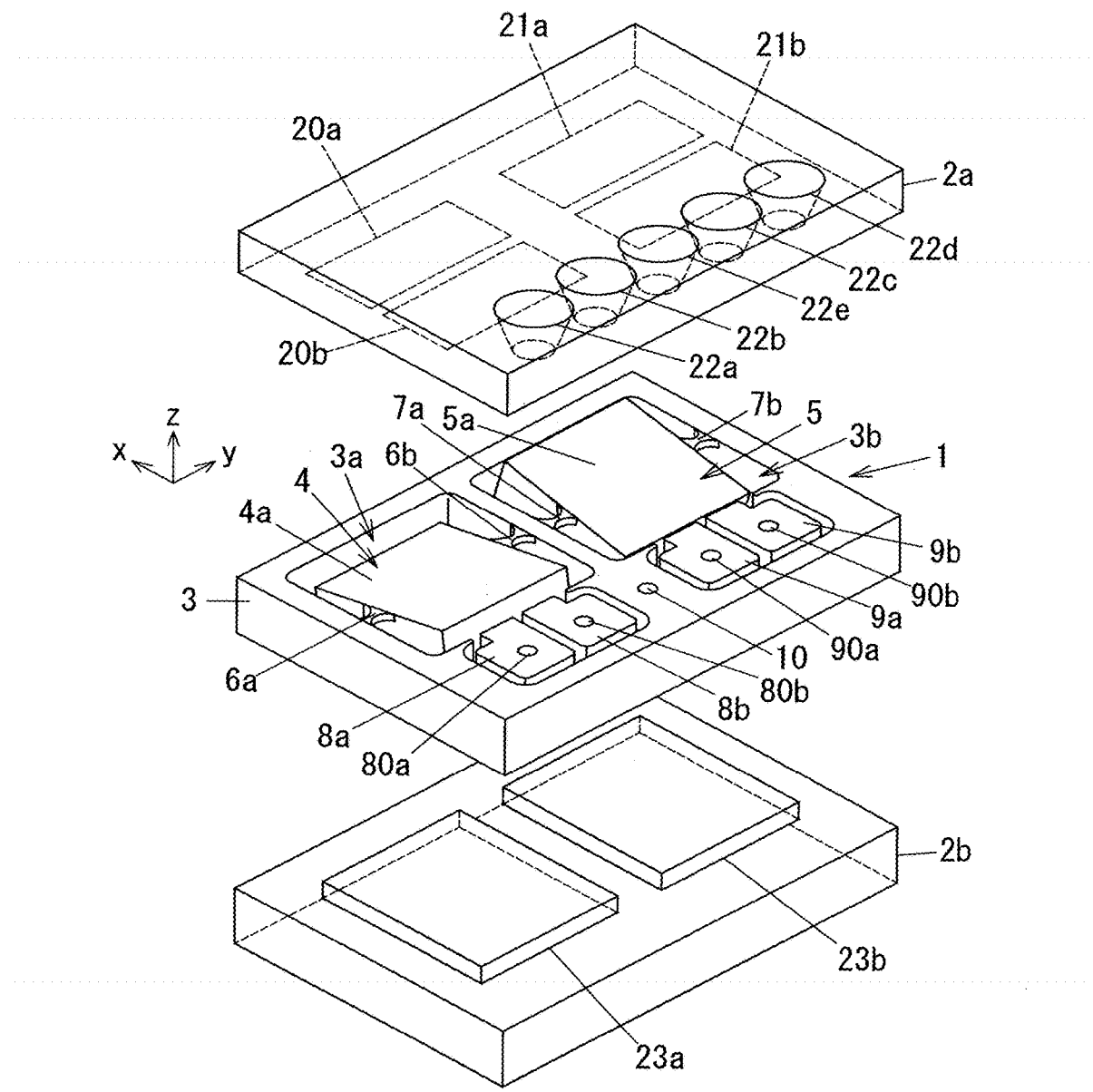
FIG. 2 is an exploded perspective view of the acceleration sensor.

As shown in FIGS. 1 and 2, an acceleration sensor according to a first embodiment includes a sensor chip 1, an upper fixed plate 2a fixed to the upper surface of the sensor chip 1 and a lower fixed plate 2b fixed to the lower surface of the sensor chip 1.

The sensor chip 1 includes a frame portion 3 having two rims 3a and 3b formed into a rectangular shape when seen in the up-down direction and arranged side by side along the longitudinal direction, rectangular parallelepiped weight portions 4 and 5 arranged adjacent to each other inside the rims 3a and 3b in a spaced-apart relationship with respect to the inner circumferential surfaces of the rims 3a and 3b, two pairs of beam portions 6a, 6b, 7a and 7b for interconnecting the inner circumferential surfaces of the rims 3a and 3b and the side surfaces of the weight portions 4 and 5 to rotatably support the weight portions 4 and 5 with respect to the frame portion 3, and movable electrodes 4a and 5a formed on the upper surfaces of the weight portions 4 and 5. The weight portion 4 is disposed in a cavity 30a, and the weight portion 5 is disposed in a cavity 30b. The cavity 30a and the cavity 30b are separated by a wall 3f.

Figure 3A:
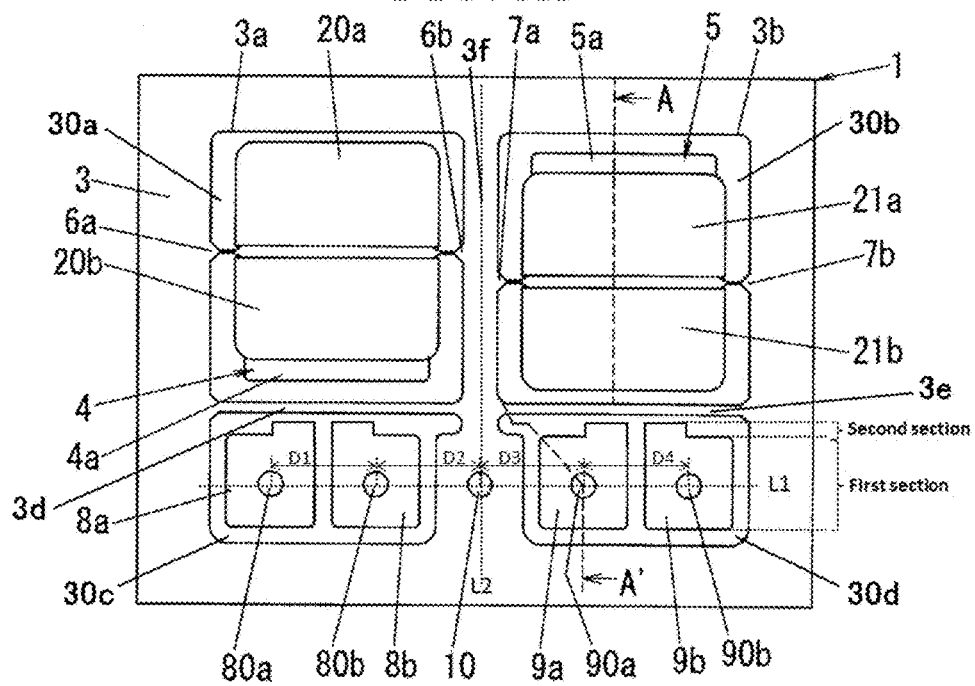
FIG. 3A is a top view of the acceleration sensor with an upper fixing plate and a conductive pattern removed for clarity and FIG. 3B is a section view taken along line A-A' in FIG. 3A.
Figure 3B:
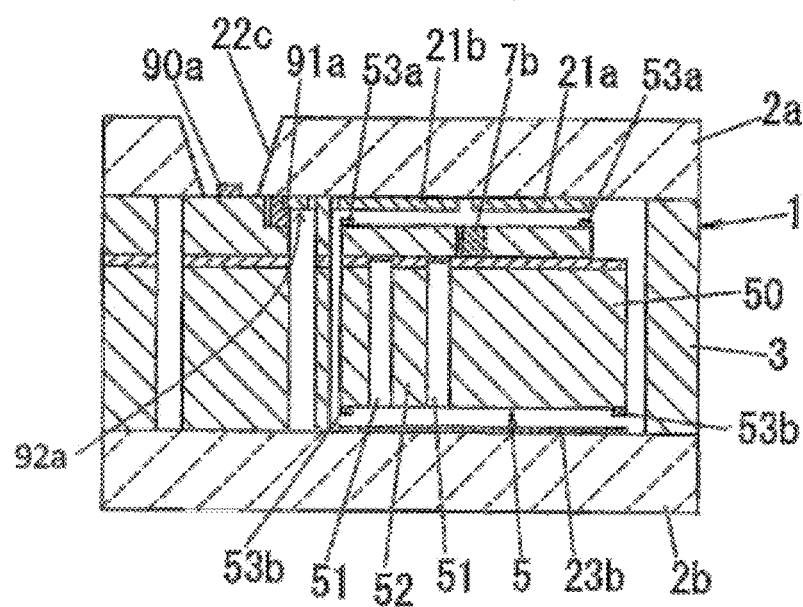

As shown in FIGS. 1 and 3B, each of the weight portions 4 and 5 includes a recess section 41 or 51 opened in one surface (the lower surface) thereof and a solid section 40 or 50 one-piece formed with the recess section 41 or 51. The recess section 41 or 51 is formed to have a rectangular shape when seen in a plan view in the direction normal to the open surface (in the up-down direction). Reinforcing walls 42 or 52 for dividing the inside of the recess section 41 or 51 into four spaces are one-piece formed with each of the weight portions 4 and 5.

Figure 4:
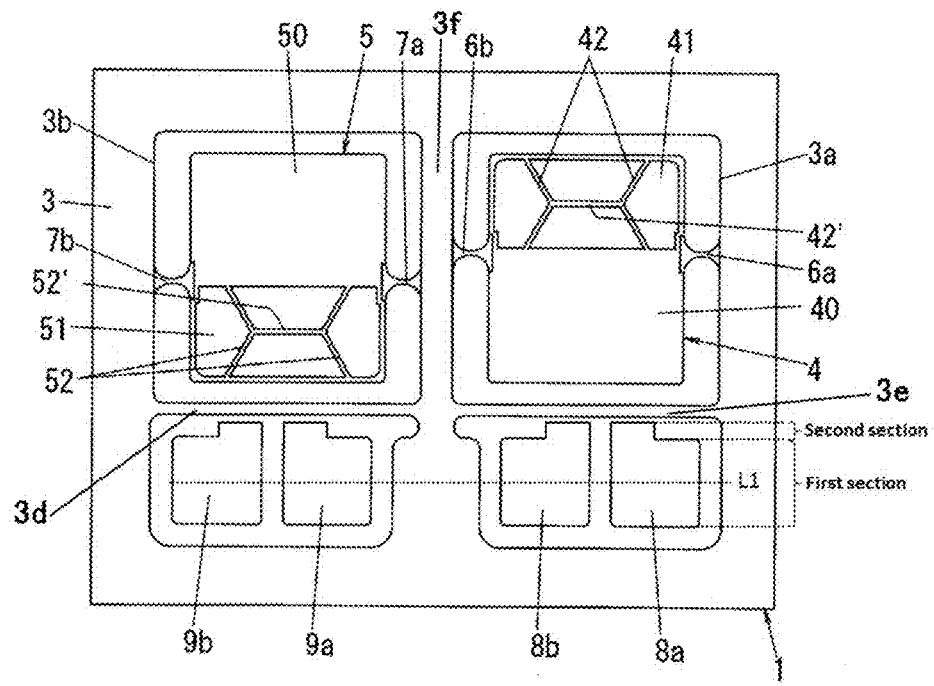
FIG. 4 is a bottom view showing a sensor chip of the acceleration sensor.
Figure 5A:
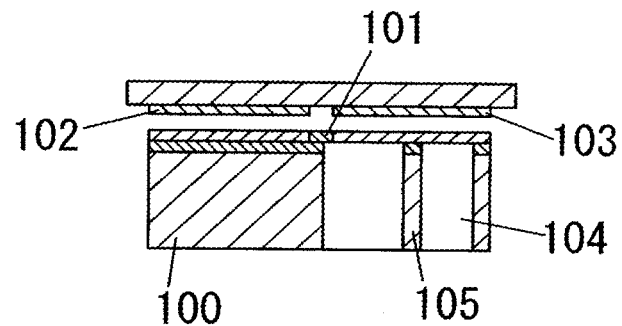
FIG. 5A is a partial section view showing a conventional acceleration sensor and FIG. 5B is a partial section view of the conventional acceleration sensor in which the section existing just below a beam portion is cut away.
Figure 5B:
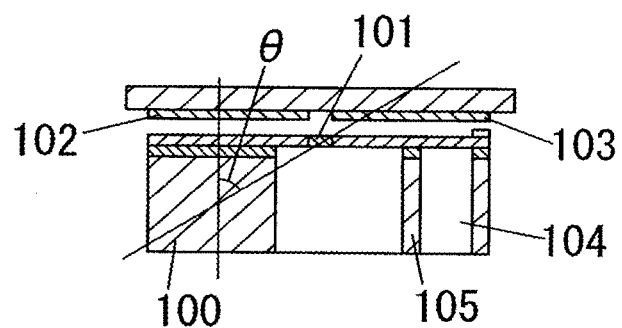

In the present embodiment, as shown in FIG. 4, the acceleration sensor employs a configuration in which the central portions of the reinforcing walls 42 or 52 having a chevron shape when seen in a plan view are interconnected by a flat reinforcing wall 42' or 52', namely a configuration in which the reinforcing walls 42 or 52 are connected to the inner wall surface in the positions where the reinforcing walls 42 or 52 do not intersect the corners of the recess section 41 or 51. Accordingly, the angle between the reinforcing walls 42 or 52 and the inner wall surface becomes obtuse at four corners of the recess section 41 or 51. This makes it easy to form (etch) the recess section 41 or 51 in the weight portions 4 and 5.

One pair of the beam portions 6a and 6b interconnects the rim 3a and the substantially central sections in the x-direction of the side surfaces of the weight portion 4 facing the rim 3a. Similarly, another pair of the beam portions 7a and 7b interconnects the rim 3b and the substantially central sections in the x-direction of the side surfaces of the weight portion 5 facing the rim 3b. Accordingly, the straight line interconnecting the beam portions 6a and 6b and the straight line interconnecting the beam portions 7a and 7b become rotation axes about which the weight portions 4 and 5 rotate, respectively.

The sensor chip 1 is formed by processing a SOI (Silicon-On-Insulator) substrate by a semiconductor fine processing technology. The sections including the upper surfaces of the weight portions 4 and 5 become the movable electrodes 4a and 5a. Protrusions 43a, 43b, 53a and 53b for preventing the weight portions 4 and 5 from directly colliding with the upper fixed plate 2a and the lower fixed plate 2b are provided to protrude from the upper and lower surfaces of the weight portions 4 and 5.

In this regard, if the protrusions 43a, 43b, 53a and 53b are formed of the main material of the sensor chip 1 such as a silicon film or a silicon oxide film, it becomes easy to form the protrusions 43a, 43b, 53a and 53b. The surface layers of the protrusions 43a, 43b, 53a and 53b may be coated with a carbon material. In this case, it is possible to increase the mechanical strength of the protrusions 43a, 43b, 53a and 53b and to prevent the protrusions 43a, 43b, 53a and 53b from being damaged by the collision with the upper fixed plate 2a and the lower fixed plate 2b. If carbon nano tubes are used as the carbon material, it is possible to reduce the thickness of a coating. This makes it possible to easily adjust the height of the protrusions 43a, 43b, 53a and 53b to a desired value.

The upper fixed plate 2a is made of an insulating material, e.g., glass, and is provided at the side of the movable electrodes 4a and 5a, namely above the sensor chip 1 in the illustrated example. On the lower surface of the upper fixed plate 2a, first and second fixed electrodes 20a and 20b are arranged side by side in the x-direction in such positions as to face the weight portion 4 (the movable electrode 4a) of the sensor chip 1 along the up-down direction. First and second fixed electrodes 21a and 21b are arranged side by side in the x-direction in such positions as to face the weight portion 5 (the movable electrode 5a) of the sensor chip 1 along the up-down direction. At one x-direction end side of the upper fixed plate 2a, five through-holes 22a through 22e are arranged in the y direction to penetrate through the upper fixed plate 2a. On the lower surface of the upper fixed plate 2a, there is formed a plurality of conductive patterns (not shown) electrically connected to the respective fixed electrodes 20a, 20b, 21a and 21b.

On the other hand, four electrode portions 8a, 8b, 9a and 9b spaced apart from the frame portion 3 are arranged side by side at one x-direction end side of the sensor chip 1. As shown in FIGS. 3A and 4, the electrode portions 8a and 8b are disposed in a cavity 30c, and the electrode portions 9a and 9b are disposed in a cavity 30b. The cavity 30a and the cavity 30c are separated by a wall 3d. The cavity 30b and the cavity 30d are separated by a wall 3e. The four electrode portions 8a, 8b, 9a and 9b each have a square first section and a rectangular second section extending from the square first section. Wherein, in each electrode of the portions 8a, 8b, 9a and 9b, an area of a second section is smaller than an area of a first section. Detection electrodes 80a, 80b, 90a and 90b made of metal films are formed substantially at the centers of the upper surfaces of the four electrode portions 8a, 8b, 9a and 9b. The detection electrodes 80a, 80b, 90a and 90b are aligned along an imaginary straight line (L1) parallel to an outer edge of the frame portion 3. Pressure contact electrodes 81a, 81b, 91a and 91b (only the pressure contact electrode 91a is shown in the drawings) made of metal films are formed on the upper surfaces of the second (end) sections of the four electrode portions 8a, 8b, 9a and 9b facing the rims 3a and 3b. The detection electrode 80 a (80b) and the pressure contact electrode 81a (81b) are connected to each other. As a result, the detection electrode 80a is electrically connected to the fixed electrode 21a via an interconnect 92a. An earth electrode 10, as a chip electrode, is formed on the upper surface of the frame portion 3 between the electrode portions 8b and 9a. The earth electrode 10 is electrically connected to the movable electrode 4a through the beam portions 6a and 6b and to the movable electrode 5a through the beam portions 7a and 7b. The detection electrodes 80a, 80b, 90a, 90b and earth electrode 10 are aligned along the imaginary straight line (L1) parallel to an outer edge of the frame portion 3. The distance between the each electrode portions 8a, 8b, 9a, 9b and earth electrode 10 (D1, D2, D3, D4) are the same as shown in the FIG. 3A. The wall 3f extends along an imaginary straight line (L2) orthogonal to the imaginary straight line (L1). The earth electrode 10 is disposed on the imaginary straight line (L2).

And, the wall has one side surface 3f1 and another side surface 3f2. The one side surface 3f1 faces the weight portion 4. The other side surface 3f2 faces the weight portion 5. The imaginary straight line E1 is extending along the one side surface 3f1 when viewed in plan. The imaginary straight line E2 is extending along the other side surface 3f2 when viewed in plan. The earth electrode 10 is disposed between the imaginary straight line E1 and the imaginary straight line E2. Further, the wall 3f has one edge 3fa and another edge 3fb. The other edge 3fb is opposite to the one edge 3fa. A distance D11 between the detection electrode 80b and the one edge 3fa of the wall 3f is larger than a distance D10 between the earth electrode 10 and the one edge 3fa of the wall 3f. A distance D12 between the detection electrode 90a and the one edge 3fa is larger than a distance D10 between the earth electrode 10 and the one edge 3fa.

If the upper fixed plate 2a is bonded to the upper surface of the sensor chip 1, the conductive patterns formed on the lower surface of the upper fixed plate 2a are connected, by pressure contact, to the pressure contact electrodes 81a, 81b, 91a and 91b. Thus the respective detection electrodes 80a, 80b, 90a and 90b are electrically connected to the fixed electrodes 20a, 20b, 21a and 21b and are exposed to the outside through the through-holes 22a through 22d of the upper fixed plate 2a. The earth electrode 10 is also exposed to the outside through the through-hole 22e.

In the present embodiment, as shown in FIG. 2, gaps are provided between the electrode portions 8a and 8b, between the electrode portions 9a and 9b, between the electrode portions 8a, 8b, 9a and 9b and the frame portion 3 and between the electrode portions 8a, 8b, 9a and 9b and the weight portions 4 and 5. With this configuration, the respective detection electrodes 80a, 80b, 90a and 90b are electrically insulated from one another. It is therefore possible to reduce the parasitic capacitance of the detection electrodes 80a, 80b, 90a and 90b and the crosstalk between the electrodes, which makes it possible to perform accurate detection of capacitance.

Just like the upper fixed plate 2a, the lower fixed plate 2b is made of an insulating material such as glass or the like. The lower fixed plate 2b is provided at the opposite side of the sensor chip 1 from the upper fixed plate 2a, namely below the sensor chip 1. Adherence-preventing films 23a and 23b are formed on the upper surface of the lower fixed plate 2b in such positions as to face the weight portions 4 and 5 of the sensor chip 1 along the up-down direction. The adherence-preventing films 23a and 23b are made of the same material as the fixed electrodes 20a, 20b, 21a and 21b, e.g., aluminum-based alloy. The adherence-preventing films 23a and 23b serve to prevent the lower surfaces of the rotated weight portions 4 and 5 from adhering to the lower fixed plate 2b. If the adherence-preventing films 23a and 23b are made of the same material as the fixed electrodes 20a, 20b, 21a and 21b in this manner, it becomes possible to easily form the adherence-preventing films 23a and 23b. At this time, if the adherence-preventing films 23a and 23b and the fixed electrodes 20a, 20b, 21a and 21b are formed simultaneously, it is possible to accurately set the distance between the weight portions 4 and 5 and the fixed electrodes 20a, 20b, 21a and 21b and the distance between the weight portions 4 and 5 and the lower fixed plate 2b.

If the adherence-preventing films 23a and 23b are formed through a semiconductor manufacturing process, fine irregularities are left on the surfaces of the adherence-preventing films 23a and 23b. This makes it possible to more reliably prevent the weight portions 4 and 5 from adhering to the lower fixed plate 2b. In this regard, if the adherence-preventing films 23a and 23b are made of aluminum-based alloy, it becomes easy to perform etching. Short-circuit between the adherence-preventing films 23a and 23b and the weight portions 4 and 5 may be prevented by forming an organic thin film, e.g., a polyimide thin film, which is highly compatible with a semiconductor manufacturing process and easy to process, on the surfaces of the adherence-preventing films 23a and 23b.

In the present embodiment, the rim 3a, the weight portion 4, the beam portions 6a and 6b, the movable electrode 4a, the first and second fixed electrodes 20a and 20b and the detection electrodes 80a and 80b make up one sensor unit. The rim 3b, the weight portion 5, the beam portions 7a and 7b, the movable electrode 5a, the first and second fixed electrodes 21a and 21b and the detection electrodes 90a and 90b make up another sensor unit. Two sensor units are one-piece formed with each other in a state that the orientations of the weight portions 4 and 5 (the arrangements of the solid sections 40 and 50 and the recess sections 41 and 51) are 180 degrees inverted on the same plane.

Description will now be made on the detection operation of the present embodiment. First, it is assumed that acceleration is applied to the weight portion 4 in the x-direction. If acceleration is applied in the x-direction, the weight portion 4 rotates about the rotation axis thereof, thereby changing the distances between the movable electrode 4a and the first and second fixed electrodes 20a and 20b. As a result, the capacitances C1 and C2 between the movable electrode 4a and the respective fixed electrodes 20a and 20b are also changed. In the regard, the capacitances C1 and C2 at the time of application of acceleration in the x-direction can be represented by equations:

$$C1 = C0 - \Delta C \quad (1); \text{and}$$

$$C2 = C0 + \Delta C \quad (2),$$

where C0 denotes the capacitance between the movable electrode 4a and the respective fixed electrodes 20a and 20b when acceleration is not applied in the x-direction and ΔC denotes the capacitance change generated by the application of acceleration.

Similarly, the capacitances C3 and C4 between the movable electrode 5a and the respective fixed electrodes 21a and 21b at the time of application of acceleration to the weight portion 5 in the x-direction can be represented by equations:

$$C3 = C0 - \Delta C \quad (3); \text{and}$$

$$C4 = C0 + \Delta C \quad (4).$$

In this connection, the values of the capacitances C1 through C4 can be detected by arithmetically processing the voltage signals extracted from the detection electrodes 80a, 80b, 90a and 90b. Then, the sum (±4ΔC) of a differential value CA (=C1−C2) between the capacitances C1 and C2 acquired from one of the sensor units and a differential value CB (=C3−C4) between the capacitances C3 and C4 acquired from the other sensor unit is calculated. Based on the sum of the differential values CA and CB, it is possible to calculate the direction and magnitude of the acceleration applied in the x-direction.

Next, it is assumed that acceleration is applied to the weight portion 4 in the z-direction. If acceleration is applied in the z-direction, the weight portion 4 rotates about the rotation axis thereof, thereby changing the distances between the movable electrode 4a and the first and second fixed electrodes 20a and 20b. As a result, the capacitances C1 and C2 between the movable electrode 4a and the respective fixed electrodes 20a and 20b are also changed. In the regard, the capacitances C1' and C2' at the time of application of acceleration in the z-direction can be represented by equations:

$$C1' = C0' - \Delta C' \quad (5); \text{and}$$

$$C2' = C0' + \Delta C' \quad (6),$$

where C0' denotes the capacitance between the movable electrode 4a and the respective fixed electrodes 20a and 20b when acceleration is not applied in the z-direction and ΔC' denotes the capacitance change generated by the application of acceleration.

Similarly, the capacitances C3' and C4' between the movable electrode 5a and the respective fixed electrodes 21a and 21b at the time of application of acceleration to the weight portion 5 in the z-direction can be represented by equations:

$$C3' = C0' - \Delta C' \quad (7); \text{and}$$

$$C4' = C0' + \Delta C' \quad (8).$$

Then, the difference (±4ΔC') of a differential value CA' (=C1'−C2') between the capacitances C1' and C2' acquired from one of the sensor units and a differential value CB' (=C3'−C4+) between the capacitances C3' and C4' acquired from the other sensor unit is calculated. Based on the difference of the differential values CA' and CB', it is possible to calculate the direction and magnitude of the acceleration applied in the z-direction. The arithmetic processing for finding the direction and magnitude of the acceleration applied in the x-direction and the z-direction using the sum of the differential values CA and CB and the difference of the differential values CA' and CB' is well-known in the art and, therefore, will not described in detail herein.

In the event that the area of the movable electrode 4a or 5a is increased with a view to enhance the detection sensitivity of the acceleration sensor as set forth above, it may be possible to adopt a method in which the thickness of the weight portion 4 or 5 is increased so that the angle between the perpendicular line extending from the gravity center position of the weight portion 4 or 5 to the rotation axis and the surface of the movable electrode 4a or 5a can become substantially equal to 45 degrees. It may also be possible to adopt a method in which the section of the weight portion 4 or 5 existing just below the beam portions 6a, 6b, 7a and 7b is cut away to reduce the weight of the weight portion 4 or 5. However, these methods are not desirable. In the present embodiment, as shown in FIG. 1, the beam portions 6a, 6b, 7a and 7b (only the beam portion 6b is shown in FIG. 1) are shifted from the generally longitudinal center of the weight portion 4 or 5 toward the recess section 41 or 51 (toward the right side) so that the angle θ between the perpendicular line extending from the gravity center position of the weight portion 4 or 5 to the rotation axis and the surface of the movable electrode 4a or 5a can become substantially equal to 45 degrees. Since the angle θ can be kept at about 45 degrees by merely shifting the beam portions 6a, 6b, 7a and 7b, it is possible to enhance the detection sensitivity without having to increase the thickness of the weight portion 4 or 5 or to reduce the weight of the weight portion 4 or 5.

In the present embodiment, the operation of the acceleration sensor can be confirmed in the below-mentioned order. More specifically, the weight portions 4 and 5 are rotated by generating an attraction force between the first fixed electrode 20a or the second fixed electrode 20b and the movable electrode 4a or between the first fixed electrode 21a or the second fixed electrode 21b and the movable electrode 5a. The normal operation of the acceleration sensor can be confirmed by detecting the change in capacitance between the fixed electrodes 20a, 20b, 21a and 21b and the weight portions 4 and 5 caused by the rotation of the weight portions 4 and 5. Alternatively, the operation of the acceleration sensor may be confirmed by generating an attraction force between the adherence-preventing films 23a and 23b and the movable electrodes 4a and 5a.

In the present embodiment, the acceleration sensor for detecting acceleration in two directions, i.e., in the x-direction and the z-direction, has been described by way of example. Alternatively, if a sensor unit including a weight portion 4 in which the recess section 41 is not formed is rotated 90 degrees within the x-y plane and arranged in a symmetrical relationship with respect to the other sensor unit, it is possible to realize an acceleration sensor capable of detecting acceleration in three directions including the y-direction.

(Second Embodiment)

Hereinafter, an acceleration sensor according to a second embodiment of the present embodiment will now be described with reference to the drawings. The basic configuration of the present embodiment is common to the first embodiment. Common components will be designated by like reference symbols with no description made thereon. The acceleration sensor of the present embodiment remains substantially the same as the configuration shown in FIG. 2 except that each of the weight portions is configured as shown in FIG. 6.

Figure 6:
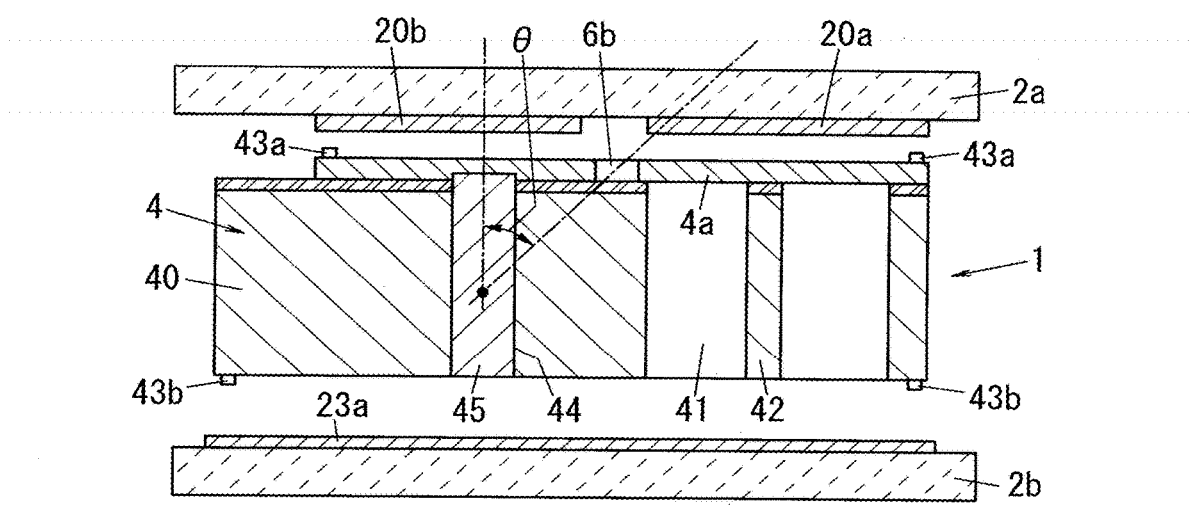
FIG. 6 is a section view showing an acceleration sensor according to a second embodiment of the present invention.

As shown in FIG. 6, each of the weight portions 4 and includes a first recess section 41 or 51 opened in one surface (the lower surface) thereof and a first solid section 40 or 50 one-piece formed with the recess section 41 or 51. The first recess section 41 or 51 is formed to have a rectangular shape when seen in a plan view in the direction normal to the open surface (in the up-down direction). A reinforcing wall 42 or 52 for dividing the inside of the recess section 41 or 51 into two spaces is one-piece formed with each of the weight portions 4 and 5.

In the present embodiment, as shown in FIG. 6, a second recess section 44 or 54 (only the second recess section 44 is shown in FIG. 6) opened in one surface (the lower surface) thereof is formed in the solid section 40 or 50. An auxiliary weight portion 45 or 55 (only the auxiliary weight portion 45 is shown in FIG. 6) made of a metallic material higher in specific gravity than the material of the weight portion 4 or 5 is embedded in the second recess section 44 or 54. If the weight portion 4 or 5 is made of silicon having a specific gravity of 2.33 g/cm$^3$, it is preferred that the constituent material of the auxiliary weight portion 45 or 55 be nickel (having a specific gravity of 8.90 g/cm$^3$), tungsten (having a specific gravity of 19.3 g/cm$^3$), chromium (having a specific gravity of 7.87 g/cm$^3$), palladium (having a specific gravity of 12.02 g/cm$^3$), platinum (having a specific gravity of 21.45 g/cm$^3$) or manganese (having a specific gravity of 7.43 g/cm$^3$). It is preferred that the weight of the auxiliary weight portion 45 or 55 be substantially equal to the weight of a structural body making up the outer wall of the first recess section 41 or 51.

In the event that, as in the conventional acceleration sensor, the area of the movable electrode 4a or 5a is increased with a view to enhance the detection sensitivity of the acceleration sensor, it may be possible to adopt a method in which the thickness of the weight portion 4 or 5 is increased so that the angle between the perpendicular line extending from the gravity center position of the weight portion 4 or 5 to the rotation axis and the surface of the movable electrode 4a or 5a can become substantially equal to 45 degrees. It may also be possible to adopt a method in which the section of the weight portion 4 or 5 existing just below the beam portions 6a, 6b, 7a and 7b is cut away to reduce the weight of the weight portion 4 or 5. However, these methods are not desirable. In the present embodiment, as shown in FIG. 6, the beam portions 6a, 6b, 7a and 7b (only the beam portion 6b is shown in FIG. 6) are shifted from the substantially longitudinal center of the weight portion 4 or 5 toward the recess section 41 or 51 (toward the right side) so that the angle θ between the perpendicular line extending from the gravity center position of the weight portion 4 or 5 to the rotation axis and the surface of the movable electrode 4a or 5a can become substantially equal to 45 degrees. Since the angle θ can be kept at about 45 degrees by merely shifting the beam portions 6a, 6b, 7a and 7b, it is possible to enhance the detection sensitivity without having to increase the thickness of the weight portion 4 or 5 or to reduce the weight of the weight portion 4 or 5.

In the present embodiment, the second recess section 44 or 54 is formed in the solid section 40 or 50 of the weight portion 4 or 5. The auxiliary weight portion 45 or 55 is embedded in the second recess section 44 or 54. It is therefore possible to reduce the size of the weight portion 4 or 5 while maintaining the weight balance of the weight portion 4 or 5. Consequently, it is possible to reduce the overall size of the acceleration sensor.

In the present embodiment, the operation of the acceleration sensor can be confirmed in the below-mentioned order. More specifically, the weight portions 4 and 5 are rotated by generating an attraction force between the first fixed electrode 20a or the second fixed electrode 20b and the movable electrode 4a or between the first fixed electrode 21a or the second fixed electrode 21b and the movable electrode 5a. The normal operation of the acceleration sensor can be confirmed by detecting the change in capacitance between the fixed electrodes 20a, 20b, 21a and 21b and the weight portions 4 and 5 caused by the rotation of the weight portions 4 and 5. Alternatively, the operation of the acceleration sensor may be confirmed by generating an attraction force between the adherence-preventing films 23a and 23b and the movable electrodes 4a and 5a.

In the present embodiment, just like the first embodiment, the acceleration sensor for detecting acceleration in two directions, i.e., in the x-direction and the z-direction, has been described by way of example. Alternatively, if a sensor unit including a weight portion 4 in which the recess section 41 is not formed is rotated 90 degrees within the x-y plane and arranged in a symmetrical relationship with respect to the other sensor unit, it is possible to realize an acceleration sensor capable of detecting acceleration in three directions including the y-direction.

Next, acceleration sensors according to third and fourth embodiments of the present embodiment will be described with reference to the drawings. The basic configurations of the third and fourth embodiments are common to the first embodiment. Common components will be designated by like reference symbols with no description made thereon. In the following description, the vertical direction and the horizontal direction in FIG. 7A will be defined as an up-down direction and a left-right direction. In the third and fourth embodiments, the upper fixed plate 2a corresponds to a "first fixed plate" and the lower fixed plate 2b corresponds to a "second fixed plate".

(Third Embodiment)

Figure 7A:
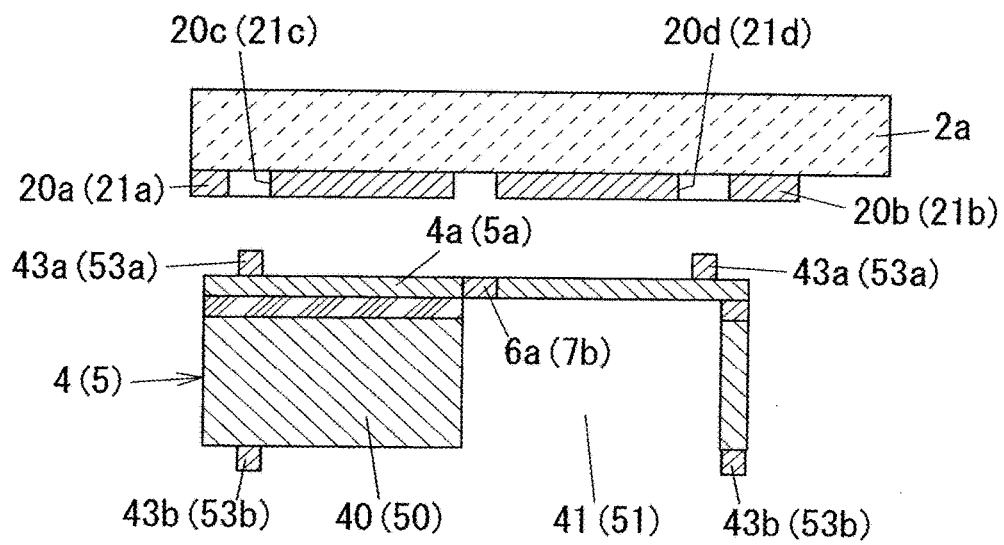
FIG. 7A is a partial section view showing an acceleration sensor according to a third embodiment of the present invention and FIG. 7B is a partial section view of an acceleration sensor according to a modified example of the third embodiment.

The present embodiment is characterized in that, as shown in FIG. 7A, engraving sections 20c, 20d, 21c and 21d are formed in the areas of the fixed electrodes 20a, 20b, 21a and 21b facing the protrusions 43a and 53a by digging out one surface (the lower surface) of the upper fixed plate 2a. Therefore, even if an impact great enough to bring the protrusions 43a and 53a into contact with the fixed electrodes 20a, 20b, 21a and 21b is applied to the acceleration sensor, the protrusions 43a and 53a come into contact with the upper fixed plate 2a through the engraving sections 20c, 20d, 21c and 21d. Thus the protrusions 43a and 53a do not make direct contact with the fixed electrodes 20a, 20b, 21a and 21b. It is therefore possible to prevent the protrusions 43a and 53a from adhering to the fixed electrodes 20a, 20b, 21a and 21b.

Figure 7B:
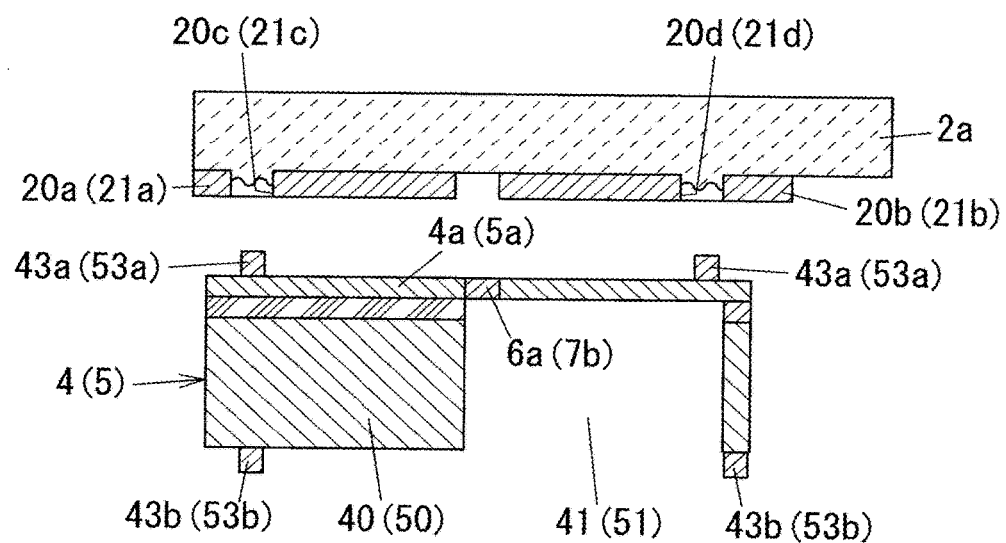

The respective fixed plates 2a and 2b are made of a glass material and the protrusions 43a and 53a are formed of a silicon film or a silicon oxide film. Therefore, it is quite unlikely that the respective fixed plates 2a and 2b and the protrusions 43a and 53a adhere to each other even when they collide with each other. However, it cannot be definitely said that the respective fixed plates 2a and 2b and the protrusions 43a and 53a never adhere to each other. In light of this, it is preferred that, as shown in FIG. 7B, the areas of one surface of the respective fixed plates 2a and 2b corresponding to the engraving sections 20c, 20d, 21c and 21d be roughened to have fine surface irregularities. This makes it possible to prevent the protrusions 43a and 53a from adhering to the respective fixed plates 2a and 2b. Examples of the method of roughening one surface of the respective fixed plates 2a and 2b include sand blasting, wet etching using such a liquid as an aqueous solution of hydrofluoric acid and dry etching using such a gas as carbon tetrafluoride.

(Fourth Embodiment)

Figure 8A:
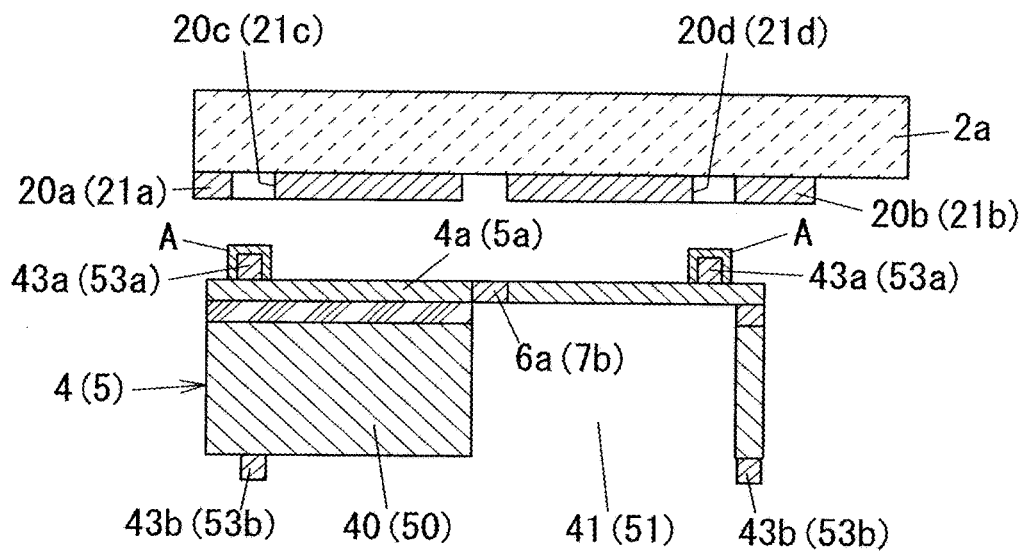
FIG. 8A is a partial section view showing an acceleration sensor according to a fourth embodiment of the present invention and FIG. 8B is a partial section view of an acceleration sensor according to a modified example of the fourth embodiment.

The present embodiment is characterized in that, as shown in FIG. 8A, thin films A made of a material higher in hardness than the constituent material of the protrusions 43a and 53a are provided on the surfaces of the protrusions 43a and 53a of the third embodiment. The thin films A are made of, e.g., a silicon nitride film, which is higher in hardness than a silicon film or a silicon oxide film. While the silicon nitride film is higher in hardness than the silicon oxide film, cracks are generated in the silicon nitride film due to the internal stresses thereof if the silicon nitride film is formed thick (to have a thickness of 0.2 μm or more). In the present embodiment, the protrusions 43a and 53a are formed into a thickness of 1 to 2 μm using a silicon film or a silicon oxide film as a base material. The thin films A having a thickness of 0.2 μm or less are formed on the surfaces of the protrusions 43a and 53a.

With the configuration described above, it is possible to reliably prevent the protrusions 43a and 53a from adhering to the respective fixed plates 2a and 2b. Since the mechanical strength of the protrusions 43a and 53a grows higher, it is possible to prevent the protrusions 43a and 53a from being damaged by the collision with the respective fixed plates 2a and 2b. The constituent material of the thin films A is not limited to the silicon nitride film but may be, e.g., a carbon material. If carbon nano tubes are used as the carbon material, it becomes possible to reduce the thickness of the thin films A and to easily adjust the thickness of the protrusions 43a and 53a to a desired value.

Figure 8B:
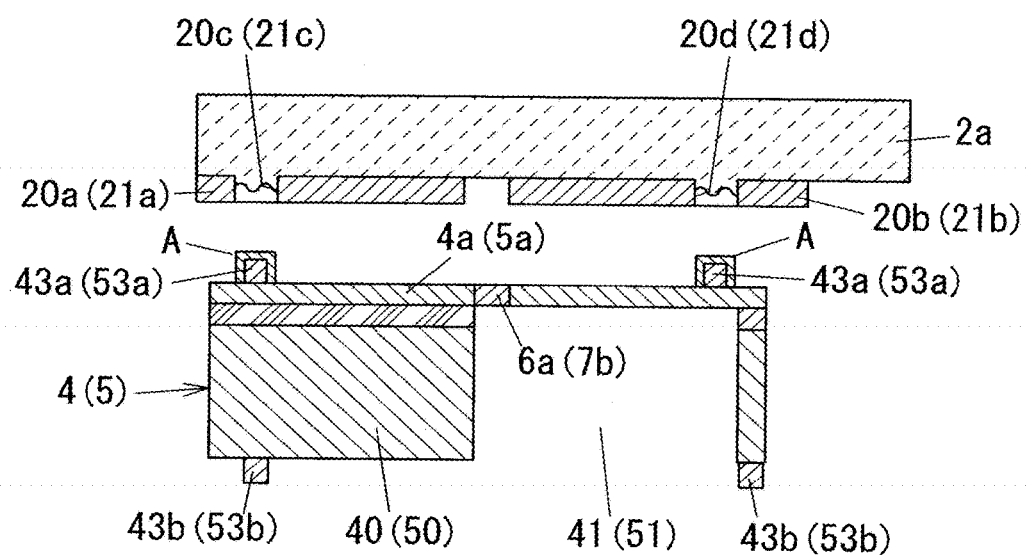

In the present embodiment, just like the third embodiment, it is preferred that the areas of one surface of the respective fixed plates 2a and 2b corresponding to the engraving sections 20c, 20d, 21c and 21d be roughened to have fine surface irregularities (see FIG. 8B).

Figure 9:
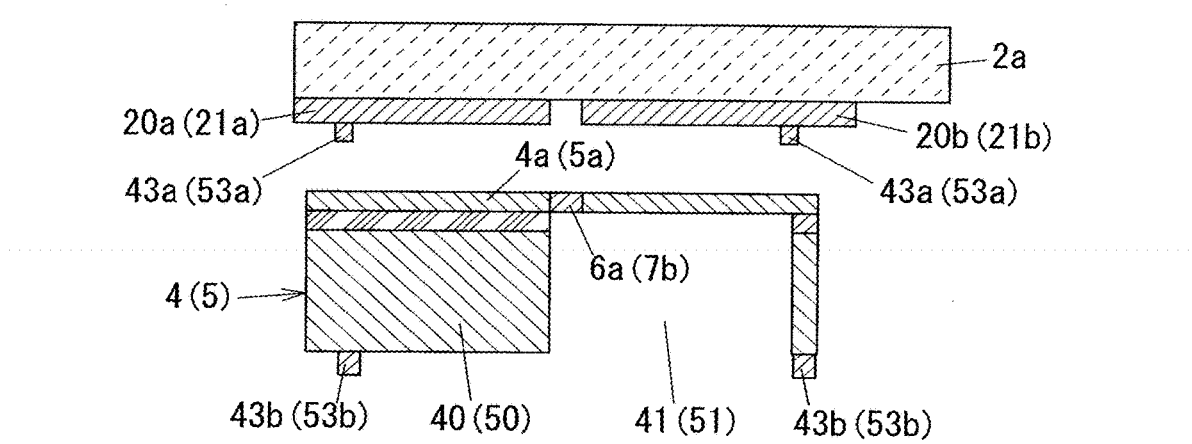
FIG. 9 is a partial section view showing an acceleration sensor according to a reference example of the present invention.

While the protrusions 43a and 53a are formed in the respective movable electrodes 4a and 5a in the third and fourth embodiments, the protrusions 43a and 53a may be formed in the fixed electrodes 20a, 20b, 21a and 21b as shown in FIG. 9. In this case, if an impact is applied to the acceleration sensor, the protrusions 43a and 53a come into contact with the movable electrodes 4a and 5a. Therefore, there is no possibility that the fixed electrodes 20a, 20b, 21a and 21b and the movable electrodes 4a and 5a make direct contact with each other. Accordingly, it is possible to prevent the movable electrodes 4a and 5a from adhering to the fixed electrodes 20a, 20b, 21a and 21b.

In the third and fourth embodiments, gaps are provided between the electrode portions 8a, 8b, 9a, 9b and 10a adjoining to each other, between the electrode portions 8a, 8b, 9a, 9b and 10a and the frame portion 3 and between the electrode portions 8a, 8b, 9a, 9b and 10a and the weight portions 4 and 5. With this configuration, the respective detection electrodes 80a, 80b, 90a and 90b are electrically insulated from one another. It is therefore possible to reduce the parasitic capacitance of the detection electrodes 80a, 80b, 90a and 90b and the crosstalk between the electrodes, which makes it possible to perform accurate detection of capacitance.

If the adherence-preventing films 23a and 23b are made of aluminum-based metal as in the prior art and are formed through a semiconductor manufacturing process, fine irregularities are left on the surfaces of the adherence-preventing films 23a and 23b. This makes it possible to reliably prevent the weight portions 4 and 5 and the protrusions 43b and 53b from adhering to the lower fixed plate 2b. However, aluminum is one of relatively soft metals. Therefore, if collision occurs repeatedly, the surfaces of the adherence-preventing films 23a and 23b become flat and the contact area grows larger. This poses a problem in that the weight portions 4 and 5 and the protrusions 43b and 53b become easy to adhere to the lower fixed plate 2b. In the third and fourth embodiments, the adherence-preventing films 23a and 23b are made of a material having substantially the same hardness as the weight portions 4 and 5 and the protrusions 43b and 53b, thereby preventing one of the protrusions 43b and 53b and the lower fixed plate 2b from being deformed by collision. Consequently, it is possible to appropriately prevent the weight portions 4 and 5 and the protrusions 43b and 53b from adhering to the lower fixed plate 2b.

In the present embodiment, just like the first embodiment, the operation of the acceleration sensor can be confirmed in the below-mentioned order. More specifically, the weight portions 4 and 5 are rotated by generating an attraction force between the first fixed electrode 20a or the second fixed electrode 20b and the movable electrode 4a or between the first fixed electrode 21a or the second fixed electrode 21b and the movable electrode 5a. The normal operation of the acceleration sensor can be confirmed by detecting the change in capacitance between the fixed electrodes 20a, 20b, 21a and 21b and the weight portions 4 and 5 caused by the rotation of the weight portions 4 and 5. Alternatively, the operation of the acceleration sensor may be confirmed by generating an attraction force between the adherence-preventing films 23a and 23b and the movable electrodes 4a and 5a.

(Fifth Embodiment)

An acceleration sensor according to a fifth embodiment of the present embodiment will now be described with reference to the drawings. The basic configuration of the present embodiment is common to the first embodiment. Common components will be designated by like reference symbols with no description made thereon. In the following description, the vertical direction in FIG. 10 will be defined as an up-down direction, the direction parallel to the longitudinal direction of a sensor chip 1 as an x-direction, the direction parallel to the transverse direction of the sensor chip 1 as a y-direction and the direction orthogonal to the x-direction and the y-direction as a z-direction.

Figure 10:
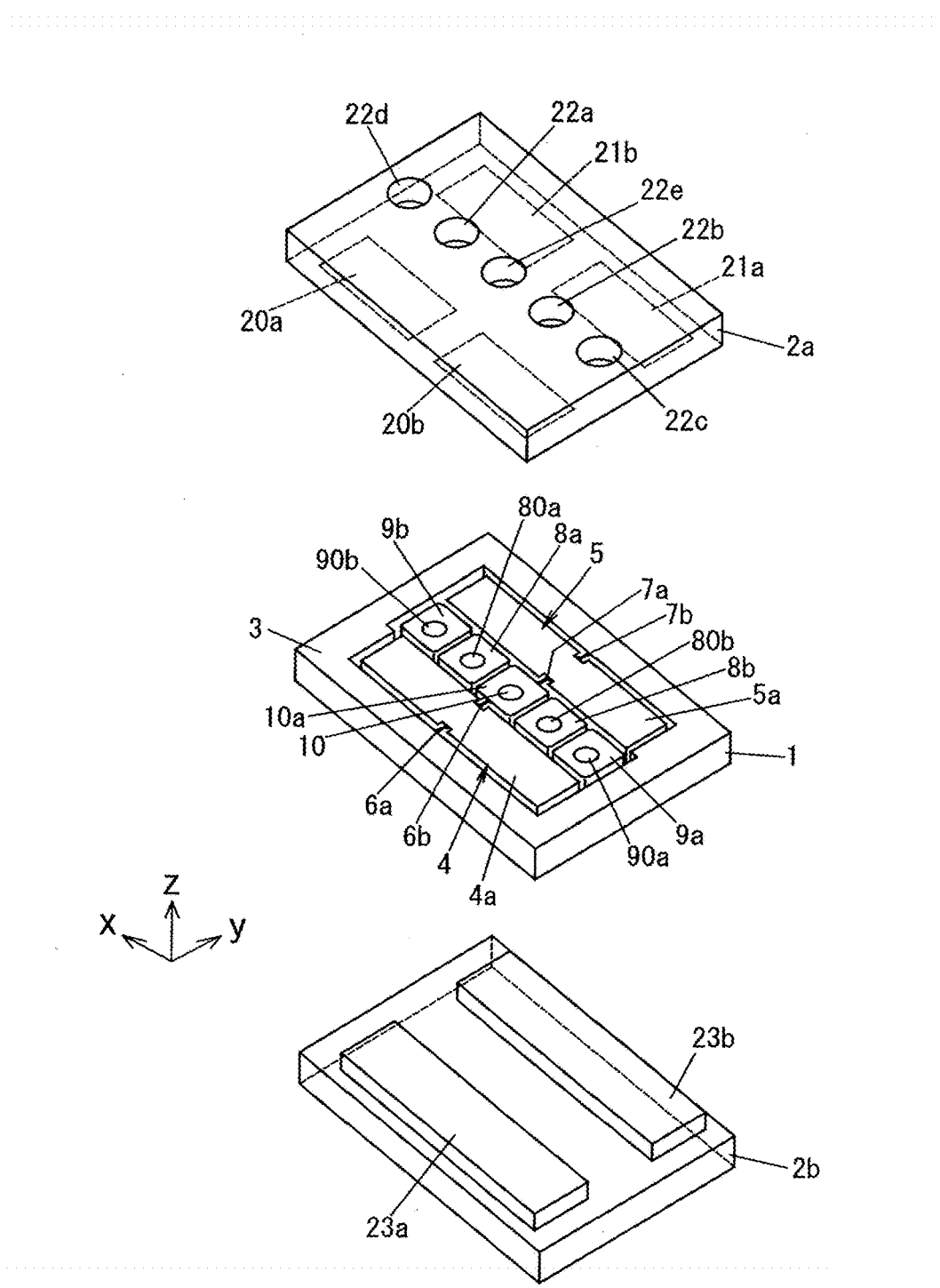
FIG. 10 is an exploded perspective view showing an acceleration sensor according to a fifth embodiment of the present invention.
Figure 11:
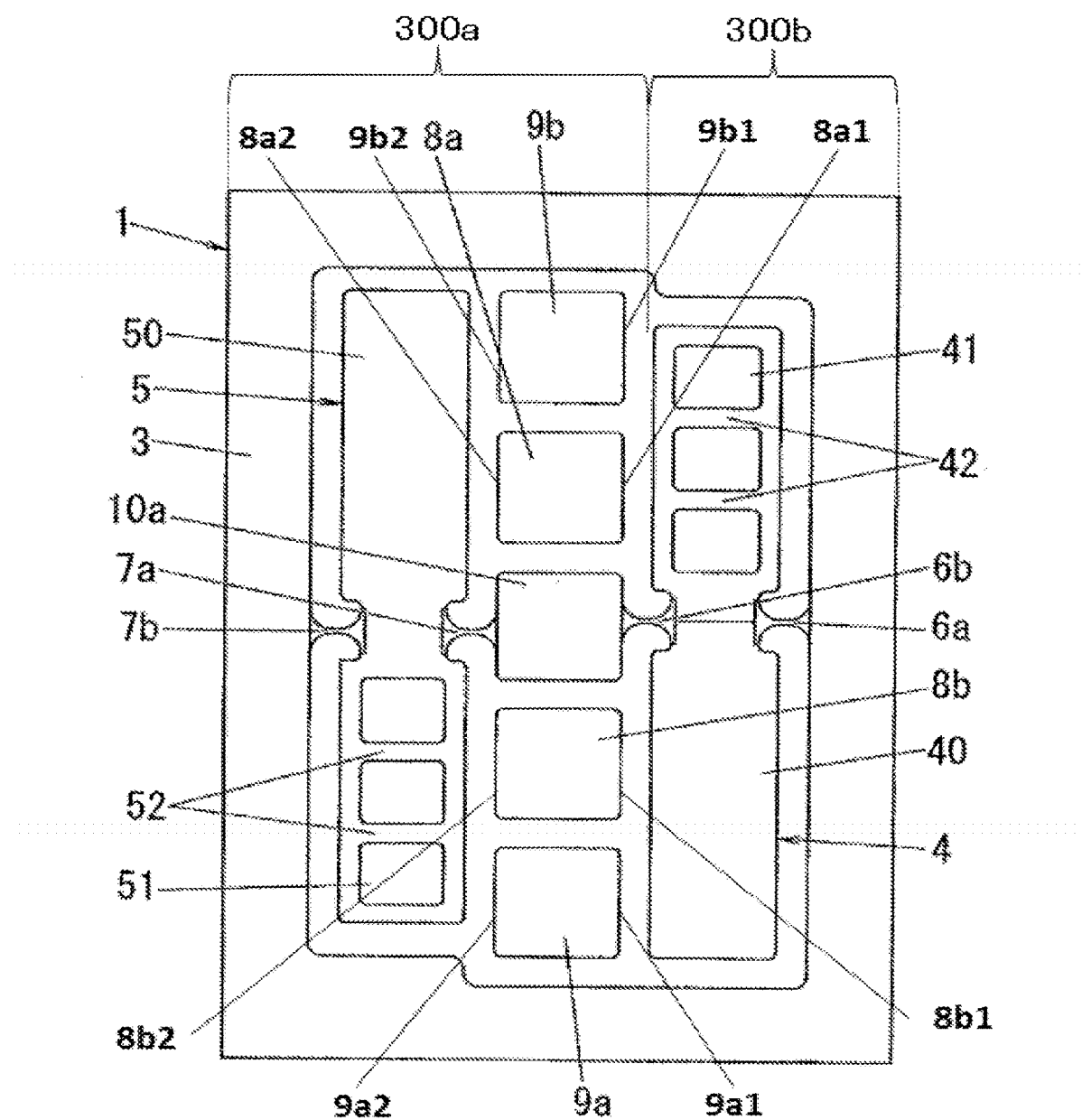
FIG. 11 is a bottom plan view showing a sensor chip of the acceleration sensor of the fifth embodiment.

In the present embodiment, as shown in FIG. 10, the respective electrode portions 8a, 8b, 9a, 9b and 10a are linearly arranged along the x-direction substantially at the transverse (y-direction) center of the sensor chip 1. In other words, the respective electrode portions 8a, 8b, 9a, 9b and 10a are arranged to divide the sensor chip 1 into two halves. In another equivalent expression, electrode portions 8a, 8b, 9a, 9b and 10a are disposed between the weight portion 4 and the weight portion 5e. An earth electrode 10 is provided on the upper surface of the electrode portion 10a. The weight portions 4 and 5 are arranged in point symmetry with respect to the center of the array of the electrode portions 8a, 8b, 9a, 9b and 10a. The respective beam portions 6a, 6b, 7a and 7b are arranged so that the straight line interconnecting the beam portions 6a, 6b, 7a and 7b can extend in the direction (y-direction) orthogonal to the arranging direction of the electrode portions 8a, 8b, 9a, and 9b. In another equivalent expression, a plurality of beam portions 6a, 6b, 7a and 7b aligned along a straight line. The electrode portion 8a and the first fixed electrode 20a are electrically connected to each other through the conductive pattern. The electrode portion 8b and the second fixed electrode 20b are electrically connected to each other through the conductive pattern. The electrode portion 9a and the first fixed electrode 21a are electrically connected to each other through the conductive pattern. The electrode portion 9b and the second fixed electrode 21b are electrically connected to each other through the conductive pattern. In the present embodiment, as shown in FIG. 11, two reinforcing walls 42 and 52 are one-piece formed with each of the weight portions 4 and 5 so as to divide the recess section 41 or 51 of each of the weight portions 4 and 5 into three spaces. In the present embodiment, as shown in FIG. 11, the frame 3 portion comprises a first region 300a having a substantially uniform width and a second region 300b having a width larger than the width of the first region 300a in plan view. In the present embodiment, as shown in FIG. 11, the electrode portions 8a and 9b are disposed on one side of the straight line and the electrode portion 9a and 8b are disposed on other side of the straight line.

With the configuration described above, the sensor chip 1 of the present embodiment is in point symmetry with respect to the earth electrode 10. This enhances the symmetry of the acceleration sensor as a whole. Even when the acceleration sensor is distorted by thermal expansion or other causes, the distortion is uniformly generated in the entirety of the acceleration sensor. Thus the overall balance is not impaired. Accordingly, a difference is hardly generated between the stresses concentrating on the solid section 40 or 50 and the recess section 41 or 51 of each of the weight portions 4 and 5 and the beam portions 6a, 6b, 7a and 7b. It is therefore possible to increase the accuracy of the output temperature characteristics.

In the present embodiment, the distances between the respective electrode portions 8a, 8b, 9a, 9b and 10a and the respective weight portions 4 and 5 become equal to each other and, therefore, the distances between the respective electrode portions 8a, 8b, 9a, 9b and 10a and the fixed electrodes 20a, 20b, 21a and 21b get equalized. In another equivalent expression, the electrode portion 8a portion has a side surface 8a1 facing to the mass portion 5. The electrode 8b portion have a side surface 8b1 facing to the mass portion 5. And a gap between the side surface 8a1 and the mass portion 5 is substantially same as a gap between the side surface 8b1 and the mass portion 5. Also, the electrode portion 8a has a side surface facing to the mass portion 4. A gap between the side surface 8a1 and the mass portion 5 is substantially same as a gap between the side surface 8a2 and the mass portion 4. This makes it possible to equalize the wiring lengths of the respective conductive patterns interconnecting the electrodes. Accordingly, it is possible to reduce the difference in parasitic capacitance of the respective conductive patterns and to reduce the difference in capacitance between the movable electrodes 4a and 5a and the fixed electrodes 20a, 20b, 21a and 21b. In the present embodiment, the electrode portions 10a can be described as a first electrode portion, the electrode portions 9a can be described as a second electrode portion, the electrode portions 8b can be described as a third electrode portion, the electrode portions 9b can be described as a fourth electrode portion, the electrode portions 9a can be described as a fifth electrode portion, the mass portion 4 can be described as a first mass portion, the mass portion 5 can be described as a second mass portion, the beam portion 6b can be described as a first beam portion, and the beam portion 7a can be described as a second beam portion.

In the present embodiment, it is possible to increase the distance from the beam portions 6a, 6b, 7a and 7b to the longitudinal ends of the weight portions 4 and 5, namely the rotation radii of the weight portions 4 and 5. This makes it possible to reduce the rotational displacement required for the sensor chip 1 to obtain the same detection sensitivity as provided by the conventional acceleration sensor of the same size. Accordingly, it is possible to increase the bending strength of the beam portions 6a, 6b, 7a and 7b. Even if the movable electrodes 4a and 5a adhere to the fixed electrodes 20a, 20b, 21a and 21b, it is possible to detach the movable electrodes 4a and 5a from the fixed electrodes 20a, 20b, 21a and 21b using the restoration force of the beam portions 6a, 6b, 7a and 7b.

Figure 12:
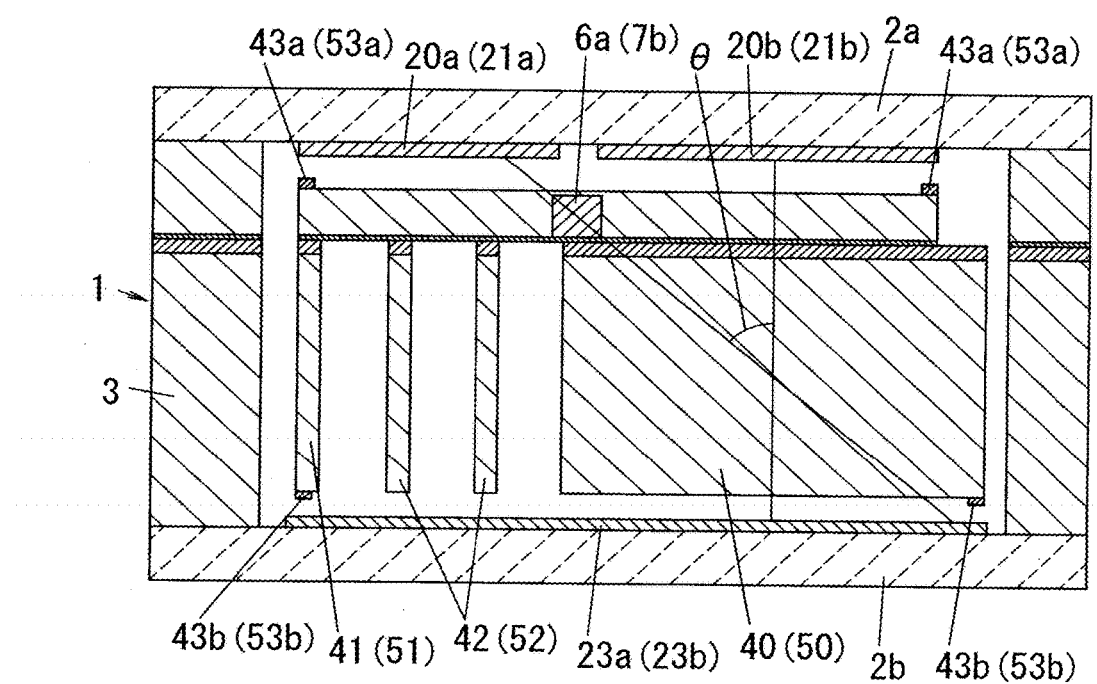
FIG. 12 is a section view of the acceleration sensor of the fifth embodiment.

In the present embodiment, just like the first embodiment, it becomes easy to form the protrusions 43a, 43b, 53a and 53b if the protrusions 43a, 43b, 53a and 53b are formed of the main material of the sensor chip 1 such as a silicon film or a silicon oxide film as shown in FIG. 12. The surface layers of the protrusions 43a, 43b, 53a and 53b may be coated with a carbon material. In this case, it is possible to increase the mechanical strength of the protrusions 43a, 43b, 53a and 53b and to prevent the protrusions 43a, 43b, 53a and 53b from being damaged by the collision with the upper fixed plate 2a and the lower fixed plate 2b. If carbon nano tubes are used as the carbon material, it is possible to reduce the thickness of a coating. This makes it possible to easily adjust the height of the protrusions 43a, 43b, 53a and 53b to a desired value.

In the present embodiment, just like the first embodiment, it becomes possible to easily form the adherence-preventing films 23a and 23b if the adherence-preventing films 23a and 23b are made of the same material as the fixed electrodes 20a, 20b, 21a and 21b as shown in FIG. 10. At this time, if the adherence-preventing films 23a and 23b and the fixed electrodes 20a, 20b, 21a and 21b are formed simultaneously, it is possible to accurately set the distance between the weight portions 4 and 5 and the fixed electrodes 20a, 20b, 21a and 21b and the distance between the weight portions 4 and 5 and the lower fixed plate 2b.

If the adherence-preventing films 23a and 23b are formed through a semiconductor manufacturing process, fine irregularities are left on the surfaces of the adherence-preventing films 23a and 23b. This makes it possible to reliably prevent the weight portions 4 and 5 from adhering to the lower fixed plate 2b. In this regard, if the adherence-preventing films 23a and 23b are made of aluminum-based alloy, it becomes easy to perform etching. Short-circuit between the adherence-preventing films 23a and 23b and the weight portions 4 and 5 may be prevented by forming an organic thin film, e.g., a polyimide thin film, which is highly compatible with a semiconductor manufacturing process and easy to process, on the surfaces of the adherence-preventing films 23a and 23b.

In the present embodiment, as shown in FIG. 10, gaps are provided between the electrode portions 8a, 8b, 9a, 9b and 10a adjoining to each other, between the electrode portions 8a, 8b, 9a, 9b and 10a and the frame portion 3 and between the electrode portions 8a, 8b, 9a, 9b and 10a and the weight portions 4 and 5. With this configuration, the respective detection electrodes 80a, 80b, 90a and 90b are electrically insulated from one another. It is therefore possible to reduce the parasitic capacitance of the detection electrodes 80a, 80b, 90a and 90b and the crosstalk between the electrodes, which makes it possible to perform accurate detection of capacitance.

In the present embodiment, as shown in FIG. 12, the beam portions 6a, 6b, 7a and 7b (only the beam portion 6a is shown in FIG. 12) are shifted from the substantially longitudinal center of the weight portion 4 or 5 toward the recess section 41 or 51 (toward the left side in FIG. 12) so that the angle θ between the perpendicular line extending from the gravity center position of the weight portion 4 or 5 to the rotation axis and the surface of the movable electrode 4a or 5a can become substantially equal to 45 degrees. Since the angle θ can be kept at about 45 degrees by merely shifting the beam portions 6a, 6b, 7a and 7b, it is possible to enhance the detection sensitivity without having to increase the thickness of the weight portion 4 or 5 or to reduce the weight of the weight portion 4 or 5.

In the present embodiment, just like the first embodiment, the operation of the acceleration sensor can be confirmed in the below-mentioned order. More specifically, the weight portions 4 and 5 are rotated by generating an attraction force between the first fixed electrode 20a or the second fixed electrode 20b and the movable electrode 4a or between the first fixed electrode 21a or the second fixed electrode 21b and the movable electrode 5a. The normal operation of the acceleration sensor can be confirmed by detecting the change in capacitance between the fixed electrodes 20a, 20b, 21a and 21b and the weight portions 4 and 5 caused by the rotation of the weight portions 4 and 5. Alternatively, the operation of the acceleration sensor may be confirmed by generating an attraction force between the adherence-preventing films 23a and 23b and the movable electrodes 4a and 5a.

The above-described embodiments can be appropriately combined without departing from the technical scope of the present invention.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A sensor configured to detect inertial force based on a change in capacitance, comprising:
   a sensor chip comprising:
      a frame portion comprising a first cavity, a second cavity, a third cavity and a fourth cavity,
      a first weight portion disposed in the first cavity,
      a second weight portion disposed in the second cavity,
      a first electrode portion disposed in the third cavity,
      a second electrode portion disposed in the fourth cavity,
      a first electrode comprising metal disposed on the first electrode portion,
      a second electrode comprising metal disposed on the second electrode portion, and
      a chip electrode comprising metal disposed on the sensor chip,
   wherein the first electrode, the second electrode and the chip electrode are aligned along a first imaginary straight line parallel to an outer edge of the frame portion,
   wherein the first cavity and the second cavity are separated by a first wall extending along a second imaginary straight line orthogonal to the first imaginary straight line, and
   wherein the chip electrode is disposed between the first electrode portion and the second electrode portion.

2. The sensor according to claim 1, wherein,
   the chip electrode is disposed on the second imaginary straight line.

3. The sensor according to claim 1, wherein,
   a distance between the first electrode and the chip electrode and a distance between the chip electrode and the second electrode are the same.

4. The sensor according to claim 1, wherein,
   the chip electrode is electrically connected to the first weight portion and the second weight portion.

5. The sensor according to claim 1, further comprising:
   a plate disposed on one surface of the sensor chip,
   wherein the plate includes a first fixed electrode facing to the first weight portion, and
   wherein the first electrode portion connects with an interconnection disposed on the plate and electrically connected to the first fixed electrode.

6. The sensor according to claim 1, wherein,
   the first cavity and the third cavity are separated by a second wall, and
   the second cavity and the fourth cavity are separated by a third wall.

7. The sensor according to claim 1, wherein,
   the first cavity and the third cavity are separated by a second wall,
   the second cavity and the fourth cavity are separated by a third wall, and
   the third cavity and the fourth cavity are separated by a part of the frame portion under the chip electrode.

8. The sensor according to claim 1, wherein the sensor chip further comprises:
   a third electrode portion disposed in the third cavity,
   a fourth electrode portion disposed in the fourth cavity,
   a third electrode comprising metal disposed on the third electrode portion, and
   a fourth electrode comprising metal disposed on the fourth electrode portion, and
   wherein the third electrode and the fourth electrode are aligned along the first imaginary straight line.

9. The sensor according to claim 1, further comprising:
   a plate disposed on one surface of the sensor chip,
   wherein the plate is at least partially removed to expose the first electrode, the second electrode and the chip electrode.

10. A sensor configured to detect inertial force based on a change in capacitance, comprising:
    a sensor chip comprising:
       a frame portion comprising a first cavity and a second cavity,
       a first weight portion disposed in the first cavity,
       a second weight portion disposed in the second cavity,
       a first electrode portion,
       a second electrode portion,
       a first electrode comprising metal disposed on the first electrode portion,
       a second electrode comprising metal disposed on the second electrode portion, and
       a chip electrode comprising metal disposed on the sensor chip; and
    a plate comprising:
       a first fixed electrode facing to the first weight portion,
    wherein the first electrode portion connects with an interconnection disposed on the plate, wherein the first electrode, the second electrode and the chip electrode are aligned along a first imaginary straight line parallel to an outer edge of the frame portion, wherein the first cavity and the second cavity are separated by a first wall extending along a second imaginary straight line orthogonal to the first imaginary straight line, and wherein the chip electrode is disposed between the first electrode portion and the second electrode portion.

11. The sensor according to claim 10, wherein,
the chip electrode is disposed on the second imaginary straight line.

12. The sensor according to claim 10, wherein,
a distance between the first electrode and the chip electrode and a distance between the chip electrode and the second electrode are the same.

13. The sensor according to claim 10, wherein,
the chip electrode is electrically connected to the first weight portion and the second weight portion.

14. The sensor according to claim 10, wherein,
the first electrode portion is disposed in a third cavity,
the second electrode portion is disposed in a fourth cavity,
the first cavity and the third cavity are separated by a second wall, and
the second cavity and the fourth cavity are separated by a third wall.

15. The sensor according to claim 14, wherein,
the third cavity and the fourth cavity are separated by a part of the frame portion under the chip electrode.

16. The sensor according to claim 14, wherein,
the sensor chip further comprises:
 a third electrode portion disposed in the third cavity,
 a fourth electrode portion disposed in the fourth cavity,
 a third electrode comprising metal disposed on the third electrode portion, and
 a fourth electrode comprising metal disposed on the fourth electrode portion, and
wherein the third electrode and the fourth electrode are aligned along the first imaginary straight line.

17. The sensor according to claim 10, wherein,
the plate is at least partially removed to expose the first electrode, the second electrode and the chip electrode.

18. A sensor configured to detect inertial force based on a change in capacitance, comprising:
a sensor chip comprising:
 a frame portion comprising a first cavity and a second cavity,
 a first weight portion disposed in the first cavity,
 a second weight portion disposed in the second cavity,
 a first electrode portion,
 a second electrode portion,
 a first electrode comprising metal disposed on the first electrode portion,
 a second electrode comprising metal disposed on the second electrode portion, and
 a chip electrode comprising metal disposed on the sensor chip,
wherein the first electrode, the second electrode and the chip electrode are aligned along a first imaginary straight line parallel to an outer edge of the frame portion,
wherein the chip electrode is disposed between the first electrode portion and the second electrode portion,
wherein the first electrode portion has a first section and a second section protruding from the first section toward the first weight portion, and wherein the second electrode portion has a has a first section and a second section protruding from the first section toward the second weight portion.

19. The sensor according to claim 18, further comprising:
a plate comprises a first fixed electrode facing to the first weight portion,
wherein the second section of the first electrode portion electrically connected to the first fixed electrode via an interconnection disposed on the plate.

20. The sensor according to claim 18, wherein,
the first cavity and the second cavity are separated by a first wall extending along a second imaginary straight line orthogonal to the first imaginary straight line.

21. A sensor configured to detect inertial force based on a change in capacitance, comprising:
a sensor chip comprising:
 a frame portion comprising a first cavity and a second cavity,
 a first weight portion disposed in the first cavity,
 a second weight portion disposed in the second cavity,
 a first electrode portion,
 a second electrode portion,
 a first electrode comprising metal disposed on the first electrode portion,
 a second electrode comprising metal disposed on the second electrode portion, and
 a chip electrode comprising metal disposed on the sensor chip,
wherein the first electrode, the second electrode and the chip electrode are aligned along a first imaginary straight line parallel to an outer edge of the frame portion,
wherein the chip electrode is disposed between the first electrode portion and the second electrode portion,
wherein the first cavity and the second cavity are separated by a first wall extending along a second imaginary straight line orthogonal to the first imaginary straight line, which has a first side surface facing the first weight portion and a second side surface facing the second weight portion, and
wherein the chip electrode is disposed between a first extending line of the first side surface and a second extending line of the second side surface when viewed in plan.

22. The sensor according to claim 21, wherein,
a distance between the first electrode and the chip electrode and a distance between the chip electrode and the second electrode are the same.

23. The sensor according to claim 21, wherein,
the chip electrode is electrically connected to the first weight portion and the second weight portion.

24. The sensor according to claim 21, wherein,
the first electrode portion is disposed in a third cavity,
the second electrode portion is disposed in a fourth cavity,
the first cavity and the third cavity are separated by a second wall, and
the second cavity and the fourth cavity are separated by a third wall.

25. The sensor according to claim 24, wherein,
the third cavity and the fourth cavity are separated by a part of the frame portion under the chip electrode.

26. The sensor according to claim 24, wherein,
the sensor chip further comprises:
 a third electrode portion disposed in the third cavity,
 a fourth electrode portion disposed in the fourth cavity,
 a third electrode comprising metal disposed on the third electrode portion, and a fourth electrode comprising metal disposed on the fourth electrode portion, and wherein the third electrode and the fourth electrode are aligned along the first imaginary straight line.

27. The sensor according to claim 21, further comprising:
a plate disposed on one surface of the sensor chip,
wherein the plate includes a first fixed electrode facing to the first weight portion, and
wherein the first electrode portion connects with an interconnection disposed on the plate and electrically connected to the first fixed electrode.

28. The sensor according to claim 21, further comprising:
a plate disposed on one surface of the sensor chip,
wherein the plate is at least partially removed to expose the first electrode, the second electrode and the chip electrode.

29. A sensor configured to detect inertial force based on a change in capacitance, comprising:
a sensor chip comprising:
a frame portion comprising a first cavity and a second cavity,
a first weight portion disposed in the first cavity,
a second weight portion disposed in the second cavity,
a first electrode portion,
a second electrode portion,
a first electrode comprising metal disposed on the first electrode portion,
a second electrode comprising metal disposed on the second electrode portion, and
a chip electrode comprising metal disposed on the sensor chip,
wherein the first electrode, the second electrode and the chip electrode are aligned along a first imaginary straight line parallel to an outer edge of the frame portion,
wherein the chip electrode is disposed between the first electrode portion and the second electrode portion,
wherein the first cavity and the second cavity are separated by a first wall extending along a second imaginary straight line orthogonal to the first imaginary straight line, which has a first edge and a second edge opposite to the first edge, and
wherein a distance between the first electrode and the first edge of the first wall is larger than a distance between the chip electrode and the first edge of the first wall.

30. The sensor according to claim 29, wherein,
a distance between the second electrode and the first edge of the first wall is larger than a distance between the chip electrode and the first edge of the first wall.

31. The sensor according to claim 29, wherein,
the chip electrode is disposed on the second imaginary straight line.

32. The sensor according to claim 29, wherein,
a distance between the first electrode and the chip electrode and a distance between the chip electrode and the second electrode are the same.

33. The sensor according to claim 29, wherein,
the chip electrode is electrically connected to the first weight portion and the second weight portion.

34. The sensor according to claim 29, wherein,
the first electrode portion is disposed in a third cavity,
the second electrode portion is disposed in a fourth cavity,
the first cavity and the third cavity are separated by a second wall, and
the second cavity and the fourth cavity are separated by a third wall.

35. The sensor according to claim 34, wherein,
the third cavity and the fourth cavity are separated by a part of the frame portion under the chip electrode.

36. The sensor according to claim 34, wherein,
the sensor chip further comprises:
a third electrode portion disposed in the third cavity,
a fourth electrode portion disposed in the fourth cavity,
a third electrode comprising metal disposed on the third electrode portion, and
a fourth electrode comprising metal disposed on the fourth electrode portion, and
wherein the third electrode and the fourth electrode are aligned along the first imaginary straight line.

37. The sensor according to claim 29, further comprising:
a plate disposed on one surface of the sensor chip,
wherein the plate includes a first fixed electrode facing to the first weight portion, and
wherein the first electrode portion connects with an interconnection disposed on the plate and electrically connected to the first fixed electrode.

38. The sensor according to claim 29, further comprising:
a plate disposed on one surface of the sensor chip,
wherein the plate is at least partially removed to expose the first electrode, the second electrode and the chip electrode.

* * * * *